United States Patent
Mamrak

(10) Patent No.: US 11,422,725 B2
(45) Date of Patent: Aug. 23, 2022

(54) POINT-CLOUD DATASET STORAGE STRUCTURE AND METHOD THEREOF

(71) Applicant: General Electric Company, Schenectady, NY (US)

(72) Inventor: Justin Mamrak, Bamberg (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 355 days.

(21) Appl. No.: 15/659,136

(22) Filed: Jul. 25, 2017

(65) Prior Publication Data

US 2019/0034109 A1    Jan. 31, 2019

(51) Int. Cl.
  *G06F 3/06* (2006.01)
  *B33Y 50/00* (2015.01)
  *G06T 17/00* (2006.01)

(52) U.S. Cl.
  CPC ............ *G06F 3/0644* (2013.01); *B33Y 50/00* (2014.12); *G06F 3/0604* (2013.01);
  (Continued)

(58) Field of Classification Search
  CPC .... G06F 3/0644; G06F 3/0604; G06F 3/0673; G06F 3/0638; G06T 2207/10028; G06T 9/001; G06T 9/40; G06T 17/00; G06T 19/20; G06T 2207/20084; G06T 9/00; G06T 2210/56; G06T 7/521; G06T 17/20; G06T 19/006; G06T 2219/2004; G06T 7/70; G06T 2207/20081; G06T 7/33; G06T 17/05; G06T 2207/10024; G06T 3/40; G06T 7/246; G06T 7/55; G06T 7/593; G06T 7/60; G06T 7/73; G06T 11/203; G06T 17/205; G06T 2207/10016; G06T 2207/20076; G06T 2207/30204; G06T 2207/30252; G06T 2207/30261; G06T 3/0068; G06T 3/20; G06T 3/4038; G06T 7/0002; G06T 7/30; G06T 7/50; G06T 7/62; G06T 7/74; G06T 7/75; G06T 7/97; G06T 9/005; G06T 9/20; G06T 11/00; G06T 11/003; G06T 11/60; G06T 13/40;
  (Continued)

(56) References Cited

U.S. PATENT DOCUMENTS

| | | | |
|---|---|---|---|
| 6,377,865 B1 * | 4/2002 | Edelsbrunner | G06K 9/28 345/419 |
| 7,317,456 B1 | 1/2008 | Lee | |
| 7,895,025 B2 | 2/2011 | Boutin | |
| 9,182,913 B2 * | 11/2015 | Flanagan | G06F 3/0611 |
| 9,262,788 B1 * | 2/2016 | Freeman | G01S 17/023 |
| 9,339,971 B2 | 5/2016 | Kraibuhler et al. | |

(Continued)

FOREIGN PATENT DOCUMENTS

| | | |
|---|---|---|
| CN | 104200518 A | 12/2014 |
| CN | 105844602 A | 8/2016 |

OTHER PUBLICATIONS

Extended European Search Report and Opinion issued in connection with corresponding EP Application No. 18182079.6 dated Nov. 26, 2018.

*Primary Examiner* — Yaima Rigol
(74) *Attorney, Agent, or Firm* — Dority & Manning, P.A.

(57) ABSTRACT

A method of storing a set of data representing a point cloud, comprising: creating an array in a digital memory having cells addressable by reference to at least one index, wherein each of the at least one indices has a predetermined correspondence to a geometric location within the point cloud; and storing a value of the data set in each of the cells.

20 Claims, 4 Drawing Sheets

| | 0x01 | 0x02 | 0x03 | 0x04 | 0x05 | 0x06 |
|---|---|---|---|---|---|---|
| 0x01 | 1 | 0 | 0 | 0 | 0 | 0 |
| 0x02 | 2 | 2 | 3 | 0 | 0 | 0 |
| 0x03 | 4 | 5 | 5 | 6 | 9 | 0 |
| 0x04 | 0 | 0 | 6 | 1 | 4 | 8 |
| 0x05 | 0 | 0 | 0 | 0 | 6 | 1 |
| 0x06 | 0 | 0 | 0 | 0 | 2 | 0 |

(52) U.S. Cl.
CPC ............ *G06F 3/0673* (2013.01); *G06T 17/00* (2013.01); *G06T 2210/56* (2013.01)

(58) Field of Classification Search
CPC ......... G06T 15/04; G06T 15/30; G06T 17/10; G06T 19/00; G06T 2200/04; G06T 2200/24; G06T 2207/10012; G06T 2207/10032; G06T 2207/10044; G06T 2207/10048; G06T 2207/20072; G06T 2207/30108; G06T 2207/30132; G06T 2207/30164; G06T 2207/30168; G06T 2207/30181; G06T 2207/30188; G06T 2207/30236; G06T 2207/30244; G06T 2207/30256; G06T 2207/30268; G06T 2210/04; G06T 2211/436; G06T 2219/2016; G06T 2219/2021; G06T 3/0031; G06T 3/0075; G06T 3/60; G06T 5/001; G06T 5/002; G06T 7/0004; G06T 7/0008; G06T 7/001; G06T 7/10; G06T 7/13; G06T 7/143; G06T 7/207; G06T 7/248; G06T 7/251; G06T 7/285; G06T 7/292; G06T 7/344; G06T 7/77; G06T 7/85; B33Y 50/00
USPC ........................................................ 711/154
See application file for complete search history.

(56) References Cited

U.S. PATENT DOCUMENTS

| | | | |
|---|---|---|---|
| 9,339,973 B2 | 5/2016 | Shi et al. | |
| 9,390,110 B2* | 7/2016 | Thiyanaratnam | ....... G06T 9/005 |
| 2004/0042552 A1 | 3/2004 | Dvorkovich et al. | |
| 2005/0168460 A1* | 8/2005 | Razdan | ............. G06F 17/30398 345/419 |
| 2008/0088623 A1 | 4/2008 | Bukowski et al. | |
| 2010/0272346 A1* | 10/2010 | Chang | .................... G01B 11/24 382/141 |
| 2012/0246166 A1* | 9/2012 | Krishnaswamy | ....... G06T 17/00 707/741 |
| 2013/0080487 A1* | 3/2013 | Chang | .................... G06T 17/00 707/827 |
| 2014/0067333 A1* | 3/2014 | Rodney | .................... G06T 19/00 703/1 |
| 2015/0125071 A1* | 5/2015 | Poelman | .............. G06K 9/4604 382/154 |
| 2015/0220812 A1* | 8/2015 | Curington | ............ G06K 9/6219 382/154 |
| 2016/0001509 A1 | 1/2016 | Long | |
| 2016/0107388 A1 | 4/2016 | Chopra et al. | |
| 2016/0224017 A1 | 8/2016 | Huang et al. | |
| 2016/0257075 A1 | 9/2016 | Levine et al. | |
| 2016/0349729 A1 | 12/2016 | Fenkl et al. | |
| 2017/0076258 A1 | 3/2017 | Grivetti | |
| 2017/0090460 A1 | 3/2017 | Andrew et al. | |

* cited by examiner

| | X → | | | | | |
|---|---|---|---|---|---|---|
| Y ↓ | 1 | 2 | 3 | 4 | 5 | 6 |
| 1 | 1 | | | | | |
| 2 | 2 | 2 | 3 | | | |
| 3 | 4 | 5 | 5 | 6 | 9 | |
| 4 | | | 6 | 1 | 4 | 8 |
| 5 | | | | | 6 | 1 |
| 6 | | | | | 2 | |

FIG. 1

| Add | X | Y | Int |
|-----|---|---|-----|
| 0x00 | 1 | 1 | 1 |
| 0x01 | 2 | 2 | 2 |
| 0x02 | 3 | 3 | 5 |
| 0x03 | 4 | 4 | 1 |
| 0x04 | 1 | 2 | 2 |
| 0x05 | 1 | 3 | 4 |
| 0x06 | 2 | 3 | 5 |
| 0x07 | 3 | 4 | 6 |
| 0x08 | 4 | 3 | 6 |
| 0x09 | 5 | 6 | 2 |
| 0x0A | 5 | 3 | 9 |
| 0x0B | 5 | 5 | 6 |
| 0x0C | 5 | 4 | 4 |
| 0x0D | 3 | 2 | 3 |
| 0x0E | 6 | 5 | 1 |
| 0x0F | 6 | 4 | 8 |

FIG. 2 (PRIOR ART)

|  | 0x01 | 0x02 | 0x03 | 0x04 | 0x05 | 0x06 |
|---|---|---|---|---|---|---|
| 0x01 | 1 | 0 | 0 | 0 | 0 | 0 |
| 0x02 | 2 | 2 | 3 | 0 | 0 | 0 |
| 0x03 | 4 | 5 | 5 | 6 | 9 | 0 |
| 0x04 | 0 | 0 | 6 | 1 | 4 | 8 |
| 0x05 | 0 | 0 | 0 | 0 | 6 | 1 |
| 0x06 | 0 | 0 | 0 | 0 | 2 | 0 |

FIG. 3

POINT-CLOUD DATASET STORAGE STRUCTURE AND METHOD THEREOF

BACKGROUND OF THE INVENTION

The present invention relates generally to data storage, and more particularly to structures and methods for data storage of large amounts of geometric data.

Various industrial and technical processes require electronic storage of data in a point cloud, defined as a set of points in a coordinate system. Point clouds are often used in situations in which large amounts of geometric data must be stored, e.g. data including indexed to 2-D or 3-D position information. Examples of such applications include digital video processing data, manufacturing process monitoring data, coordinate measuring machine ("CMM") data, etc.

One particular example of the use of this kind of geometric data would be process monitoring of an additive manufacturing process. Additive manufacturing is a process in which material is built up layer-by-layer to form a component. Additive manufacturing is also referred to by terms such as "layered manufacturing," "reverse machining," "direct metal laser melting" (DMLM), "selective laser sintering" (SLS), stereolithography (SLA), and "3-D printing." Such terms are treated as synonyms for purposes of the present invention.

One kind of process monitoring for additive manufacturing uses an optical sensor to generate weld pool intensity measurements at many individual points over the surface of workpiece.

In the prior art, this point cloud data is generally stored in a tabular form. In this storage format, using the weld pool intensity measurement as an example, each table row stores an X position, a Y position, and the integer value of the data. One problem with this tabular format is that it requires a disproportionately large amount of storage for large data sets. While computer storage and processing power has generally become more available and less expensive, it does have finite limits and it is desirable to limit the amount of storage required.

BRIEF DESCRIPTION OF THE INVENTION

This problem is addressed by a method of storing point cloud data using an array structure.

According to one aspect of the technology described herein, a method of storing a set of data representing a point cloud includes: creating an array in a digital memory having cells addressable by reference to at least one index, wherein each of the at least one index has a predetermined correspondence to a geometric location within the point cloud; and storing a value of the data set in each of the cells.

According to another aspect of the technology described herein, a method of storing a set of data representing a point cloud includes: using a sensor to collect data values from a physical process, each data value corresponding to a specific geometric location which is defined by reference to one or more physical coordinate indices; multiplying each of the one or more physical coordinate indices by a predetermined scalar multiplication factor, so as to produce one or more array indices; creating an array in a digital memory having cells addressable by reference to the one or more array indices; and for each specific geometric location within the point cloud, storing the sensed data value in the corresponding cell of the array.

According to another aspect of the technology described herein, a data structure for storing a data set representing a point cloud includes: an array having a first index and a second index each correlated to a physical value; and a plurality of cells addressable by the indices, each cell containing a value of the data set.

BRIEF DESCRIPTION OF THE DRAWINGS

The invention may be best understood by reference to the following description taken in conjunction with the accompanying drawing figures in which:

FIG. 1 is a chart depicting an example of a dataset representing sensed information related to a physical process;

FIG. 2 is a chart depicting a prior art format for storing the information shown in FIG. 1;

FIG. 3 is a chart depicting an exemplary format for storing the information shown in FIG. 1, according to one aspect of the present invention.

DETAILED DESCRIPTION OF THE INVENTION

Figure 1:
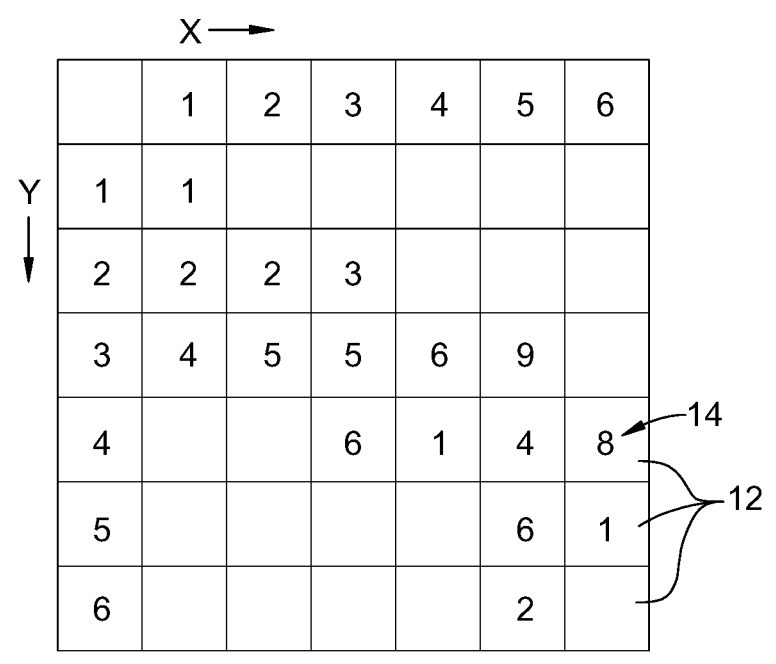
Figure 4:
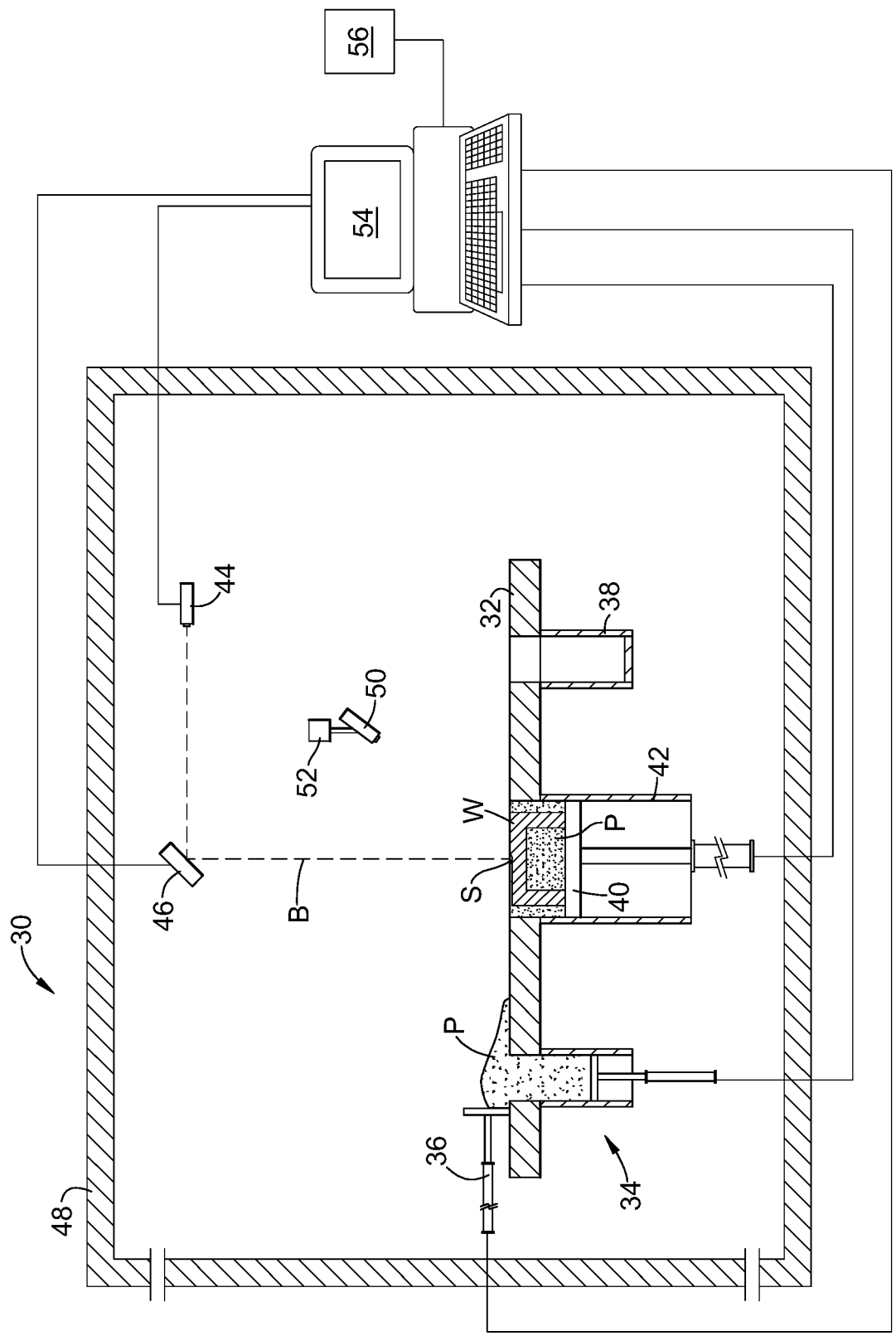
FIG. 4 is a schematic sectional diagram of an exemplary additive manufacturing apparatus.

Referring to the drawings wherein identical reference numerals denote the same elements throughout the various views, FIG. 1 is a chart showing a data set 10 which is generally representative of a physical entity or process. For example, the data contained in the data set 10 may be values measured by a measuring instrument, values sensed by one or more sensors, or engineering data representative of a physical entity, such as an engineering drawing or computer model. The chart includes a number of columns arrayed along an X-axis, labeled with an index (i.e. values 1 through 6 in this particular example). The chart further includes a number of rows arrayed along a Y-axis mutually perpendicular to the X-axis, labeled with an index (i.e. values 1 through 6 in this example). The chart thus includes thirty-six individual cells 12 which can be referenced by the paired X, Y index references.

Each cell 12 contains a data value 14. For example, the value may be an alphanumeric value, an integer, or a long-format number. In the illustrated example, the cells contain integer values.

For the purposes of explanation, an example is shown in which fifteen of the cells 12 contain nonzero values (cells 12 which are shown as blank may be considered to be zero or null values). It is noted that null or zero values are highly compressible using existing compression algorithms; this is an advantage of the data storage format described herein.

FIG. 2 is a chart showing a prior art format for storing the information shown in the chart of FIG. 1. The chart is a visual representation of a table 16 that would be stored in a digital memory operably connected to a computing device.

As used herein, the term "computing device" includes any apparatus having one or more processors operable to execute programmed instructions, such as a mainframe computer, minicomputer, microcomputer, portable computing device, or microprocessor. A typical computing device includes a central processing unit ("CPU"), digital memory, a power supply, and input and output devices, (e.g., display, keyboard, mouse).

As used herein, the term "digital memory" includes any structure or apparatus operable to store digital data, regardless of the underlying principle of operation, e.g. electronic, magnetic, or optical. Nonlimiting examples of digital memory devices include RAM, ROM, flash memory, magnetic or solid-state hard disk drives, optical disks, or magnetic tape.

The table 16 contains sixteen rows 18, one row 18 being provided for each nonzero value. Each row 18 is identified by an address, here shown as a simple hexadecimal index (i.e. 0x00 through 0x0F). Each row 18 contains a stored value for the X-location, the Y-location, and the corresponding data value. It will thus be understood that in this example, it is necessary to store 48 individual values in order to completely represent the data set 10.

In contrast, FIG. 3 is a chart showing an exemplary structure for storing the information shown in the chart of FIG. 1, following the data storage principles of an aspect of the present invention. The chart is a visual representation of an array 20 that would be stored in digital memory associated with a computing device.

In this format, physical positions are mapped by reference to indices that relate to memory addresses within the digital memory structure. A first index 22 (a column in this example) corresponds to the Y-locations as described above. A second index 24 (a row in this example) corresponds to the X-locations as described above.)

The array 20 thus includes thirty-six individual cells 26 which can be mapped or addressed by the paired index references. It will be understood that other coordinate systems may be used (for example polar coordinates). It will be further understood that this data storage format is applicable to coordinate systems having any number of dimensions.

Each cell 26 stores a data value. In one example, the value may be, for example, an alphanumeric value, an integer, or a long-format number.

In this example, it is necessary to store only 36 individual values (some of which are zero or null) in order to completely represent the data set 10.

It will be understood that it is unlikely that the arbitrary (e.g. integer) values of the matrix indices 22, 24 are exactly equal to the real-world physical dimensions. This issue is addressed by providing a scalar multiplication factor to relate the arbitrary row and column references to the real-world values. So for example, if the integer matrix indices are 1, 2, 3, etc. and the physical intervals are 0.1, 0.2, 0.3, etc. then the multiplication factor would be 0.1.

In use, the physical intervals would be multiplied by the scalar multiplication or its inverse, depending on whether data is being stored or retrieved.

As noted above, this data organization concept is broadly applicable to any application in which data is stored in a point cloud. It is particularly applicable to processes in which the data relates to physical processes (e.g. measurements or sensed values). One exemplary application of the process is data storage related to additive manufacturing, an example of which will be described below.

FIG. 4 illustrates schematically an additive manufacturing apparatus 30 of a known type. The apparatus includes a table 32, a powder supply 34, a recoater 36, an overflow container 38, a build platform 40 surrounded by a build chamber 42, a directed energy source 44, and a beam steering apparatus 46, all surrounded by an enclosure 48.

An example of a basic build process for a workpiece W using the apparatus 30 is as follows. The build platform 40 is positioned below the table 32 by a selected layer increment. Powder "P" is then deposited over the build platform 40, using the powder supply 34 and the recoater 36.

The directed energy source 44 is used to melt a two-dimensional cross-section or layer of the workpiece W being built. The directed energy source 44 emits a beam "B" and the beam steering apparatus 46 is used to steer the focal spot "S" of the build beam B over the exposed powder surface in an appropriate pattern. A small portion of exposed layer of the powder P surrounding the focal spot S, referred to herein as a "weld pool" is heated by the build beam B to a temperature allowing it to melt, flow, and consolidate. This step may be referred to as fusing the powder P. The weld pool radiates energy in a known part of the electromagnetic spectrum and the intensity of this radiated energy may be used for temperature measurement.

The build platform 40 is moved vertically downward by the layer increment, and another layer of powder P is applied in a similar thickness. The directed energy source 44 again emits a build beam B and the beam steering apparatus 46 is used to steer the focal spot S of the build beam B over the exposed powder surface in an appropriate pattern. The exposed layer of the powder P is heated by the build beam B to a temperature allowing it to melt, flow, and consolidate both within the top layer and with the lower, previously-solidified layer. the cycle of moving the build platform 40, applying powder P, and then directed energy fusing the powder P is repeated until the entire workpiece W is complete.

A monitoring process may be incorporated into the build process described above. Generally stated, the monitoring process includes using one or more sensors to measure signals generated during the build process. Nonlimiting examples of signals that can be measured include, for example: displacement, position, velocity, or acceleration of the various moving components of the apparatus 30, vibration or acoustic signals generated by the apparatus 30, or electromagnetic radiation generated by the apparatus 30, such as the intensity of the build beam B or of the weld pool.

For example, FIG. 4 illustrates non-contact sensor 50 disposed above the table 12 and configured to detect EM radiation. For example, the sensor 50 may comprise a photodetector or camera having an appropriate EM band sensitivity. The sensor 50 is used merely as a illustrative example and it will be understood that the processing monitoring and data storage described below may be applied to other types of sensors, including but not limited to any of the other sensors described above (e.g. displacement, position, velocity, acceleration, vibration or acoustic).

The sensor 50 may be provided with appropriate means for measuring signals with a required spatial resolution, such as using an array of sensors, or using one or more sensors that can be steered to place their field of view in a known position. In the illustrated example, a sensor steering apparatus 52 is used to orient the sensor 50 to an appropriate position over the exposed powder surface.

In operation, the sensor 50 is operable to detect a weld pool radiation intensity and to identify the location of the intensity measurement within the X-Y plane. The data produced from the sensor 50, for example, includes an intensity value for each discrete X-Y location. For example, FIG. 1 may be representative of the sensed data.

The operation of the apparatus 10, including for example control of the powder supply 34, recoater 36, build platform 40, directed energy source 44, and/or the beam steering apparatus 46, may be controlled by one or more computing devices. A representative computing device 54 is shown schematically in FIG. 4, with single lines indicating operative connections to the various components (e.g. data and/or control lines). Such connections may be wired or wireless. The computing device 54 is operably connected to a digital memory as described above, shown schematically at 56.

The sensor information may be used for numerous purposes. For example, it may be used for quality control by comparing a sensed weld pool intensity to a predetermined weld pool intensity (e.g. determined by process design intent or expected values determined by analysis).

Alternatively, predetermined weld pool information may be used for feedback control of the operation of the apparatus 10. For example, weld pool intensity values from the sensor 50 may be compared to a predetermined weld pool intensity. Any difference in the sensed value in the predetermined value may be used to generate an error signal which may be fed to the apparatus 10 in use to adjust operation of the apparatus 10.

In either case, the data from the sensors 50 would be stored in digital memory 56 using the format as described above. More specifically, the sensed value for each specific location in the X-Y plane of a particular layer would be stored in one of the cells 26 of the array 20 described above.

The point cloud data storage format described herein has several advantages over prior art storage formats. As described in the example above, it greatly reduces the amount of storage space required. A key feature is that the reduction in storage space is "lossless", i.e., the process of reducing the amount of data storage used does not introduce errors or loss of data, as can be the case with known compression algorithms. It is not "compression" per se but rather a method of reorganizing the data to optimize what is important to capture. Furthermore, if further reductions in data storage space are desired, this data storage format is compatible with existing and future compression algorithms.

The foregoing has described a structure and method for storing point cloud information. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of storing a data set representing a point cloud, the method comprising:
    creating an array in a digital memory having cells addressable by reference to at least one index, wherein the at least one index has a predetermined correspondence to a geometric location within the point cloud, the predetermined correspondence to the geometric location within the point cloud comprising a predetermined scalar multiplication factor; and
    storing a value of the data set in each of the cells.

2. The method of claim 1, wherein the array comprises two or more indices, corresponding to two or more physical dimensions, wherein the two or more indices cooperatively define specific geometric locations within the point cloud.

3. The method of claim 1, wherein the array comprises first and second indices, corresponding to first and second mutually perpendicular axes.

4. The method of claim 1, comprising:
    mapping the at least one index to a digital memory address.

5. The method of claim 1, wherein the value stored in each cell comprises a scalar quantity.

6. The method of claim 1, comprising:
    multiplying a physical dimension by the predetermined scalar multiplication factor to determine a value of the at least one index.

7. The method of claim 1, wherein the point cloud comprises a plurality of points in a coordinate system of a physical manufacturing process.

8. The method of claim 7, wherein the physical manufacturing process comprises an additive manufacturing process.

9. A method of storing a set of data representing a point cloud, the method comprising:
    using a sensor to collect a plurality of data values from a physical process, wherein respective ones of the plurality of data values respectively correspond to a specific geometric location defined by reference to one or more physical coordinate indices;
    multiplying each of the one or more physical coordinate indices by a predetermined scalar multiplication factor, so as to produce one or more array indices;
    creating an array in a digital memory having a plurality of cells, respective ones of the plurality of cells being addressable by reference to the one or more array indices; and
    for each specific geometric location within the point cloud, storing respective ones of the plurality of data values in a corresponding one of the plurality of cells of the array.

10. The method of claim 9, wherein the array comprises two or more indices, corresponding to two or more physical dimensions, wherein the two or more indices cooperatively define specific geometric locations within the point cloud.

11. The method of claim 9, wherein the array comprises first and second indices, corresponding to first and second mutually perpendicular axes.

12. The method of claim 9, wherein the one or more array indices are mapped to digital memory addresses.

13. The method of claim 9, wherein respective ones of the plurality of data values respectively comprise a scalar quantity.

14. The method of claim 9, wherein the plurality of data values are collected from a physical manufacturing process.

15. The method of claim 14, wherein the physical manufacturing process comprises an additive manufacturing process.

16. A data structure for storing a data set representing a point cloud, the data structure comprising:
    an array comprising a first index and a second index respectively correlated to a physical value at least in part by a predetermined scalar multiplication factor; and
    a plurality of cells addressable by the first index and the second index, wherein at least some of the plurality of cells contain a value of the data set;
    wherein the data structure is stored in a digital memory.

17. The data structure of claim 16, wherein the first index and the second index cooperatively define specific geometric locations within the point cloud.

18. The data structure of claim 17, wherein the point cloud comprises a plurality of points in a coordinate system of a physical manufacturing process.

19. The data structure of claim 18, wherein the physical manufacturing process comprises an additive manufacturing process.

20. The data structure of claim 16, wherein the first index comprises a first axis and the second index comprises a second axis, wherein the first axis is perpendicular to the second axis.

\* \* \* \* \*